US007748983B2

(12) United States Patent
Blackburn et al.

(10) Patent No.: US 7,748,983 B2
(45) Date of Patent: Jul. 6, 2010

(54) FLAMELESS FIRE EXTINGUISHER TRAINING METHODS AND APPARATUS

(75) Inventors: John Joseph Blackburn, Squamish (CA); Ryan O'Donnell, Guilderland, NY (US); Thomas Rossi, Troy, NY (US)

(73) Assignee: BullEx, Inc., Albany, NY (US)

( * ) Notice: Subject to any disclaimer, the term of this patent is extended or adjusted under 35 U.S.C. 154(b) by 635 days.

(21) Appl. No.: 11/369,303

(22) Filed: Mar. 7, 2006

(65) Prior Publication Data

US 2007/0218436 A1 Sep. 20, 2007

(51) Int. Cl.
*G09B 19/00* (2006.01)

(52) U.S. Cl. ..................................................... 434/226

(58) Field of Classification Search ................. 434/226, 434/219; 40/428; 362/92; 472/65

See application file for complete search history.

(56) References Cited

U.S. PATENT DOCUMENTS 4,001,949 A 1/1977 Francis .......................... 35/10
4,303,396 A 12/1981 Swiatosz .................... 434/226
4,526,548 A 7/1985 Livingston .................. 434/226
4,592,730 A 6/1986 Knight et al. ................. 434/22
4,611,993 A 9/1986 Brown ......................... 434/21
4,983,124 A 1/1991 Ernst et al. .................. 434/226
5,059,124 A 10/1991 Tsujita
5,233,869 A 8/1993 Rogers et al. ................. 73/294
5,447,437 A 9/1995 Joynt et al. ................. 434/226
5,518,403 A 5/1996 Luftig et al. ................ 434/226
5,752,835 A 5/1998 Whitmer, Sr. ............... 434/226
5,823,784 A 10/1998 Lane .......................... 434/226
5,924,784 A 7/1999 Chiliwnyj et al. ........... 362/234
5,927,990 A 7/1999 Welch et al. ................ 434/226
6,047,489 A 4/2000 Hess et al. ..................... 40/428
6,129,552 A * 10/2000 Deshoux et al. ............. 434/226
6,317,266 B1 11/2001 Yoshimura et al. .......... 359/619
6,363,636 B1 * 4/2002 Hess et al. ..................... 40/428
6,599,127 B1 7/2003 Hopmeier (Continued)

FOREIGN PATENT DOCUMENTS

FR 2714197 A1 6/1995

(Continued)

OTHER PUBLICATIONS

International Search Report for related PCT application mailed Oct. 17, 2007.

*Primary Examiner*—Kurt Fernstrom
(74) *Attorney, Agent, or Firm*—Heslin Rothenberg Farley & Mesiti P.C.

(57) ABSTRACT

Methods and apparatus for use in fire extinguisher training are provided. These methods and apparatus are implemented electronically without the need for an open flame. The training apparatus includes a display having a plurality of light sources adapted to display a varying light pattern simulating a dynamic flame; a sensor adapted to detect a stimulus emitted by one of a fire extinguisher and a fire extinguisher simulator and output a signal corresponding to the detected stimulus; and one or more processors adapted to receive the output from the sensor and vary the light pattern simulating the dynamic flame on the display in response to the stimulus detected by the sensor. The methods and apparatus may be used to train firefighters in the proper use of a fire extinguisher, for example, training in the techniques typically required when suppressing class A, B, C, D, or K type fires.

58 Claims, 8 Drawing Sheets

U.S. PATENT DOCUMENTS

| | | | | |
|---|---|---|---|---|
| 6,677,935 | B2 | 1/2004 | Kobayashi et al. | 345/181 |
| 6,688,752 | B2 * | 2/2004 | Moore | 362/234 |
| 6,780,014 | B1 * | 8/2004 | Hull et al. | 434/22 |
| 6,869,363 | B2 | 3/2005 | Okitsu et al. | 436/29 |
| 7,175,439 | B2 * | 2/2007 | Darois et al. | 434/226 |
| 2004/0191736 | A1 | 9/2004 | Werhun | 434/226 |
| 2005/0202379 | A1 | 9/2005 | Darois et al. | 434/226 |
| 2005/0233289 | A1 | 10/2005 | Hoglund | 434/226 |

FOREIGN PATENT DOCUMENTS

| | | | |
|---|---|---|---|
| FR | 2745502 | A1 | 9/1997 |
| FR | 2745503 | A1 | 9/1997 |

* cited by examiner

FIG.1
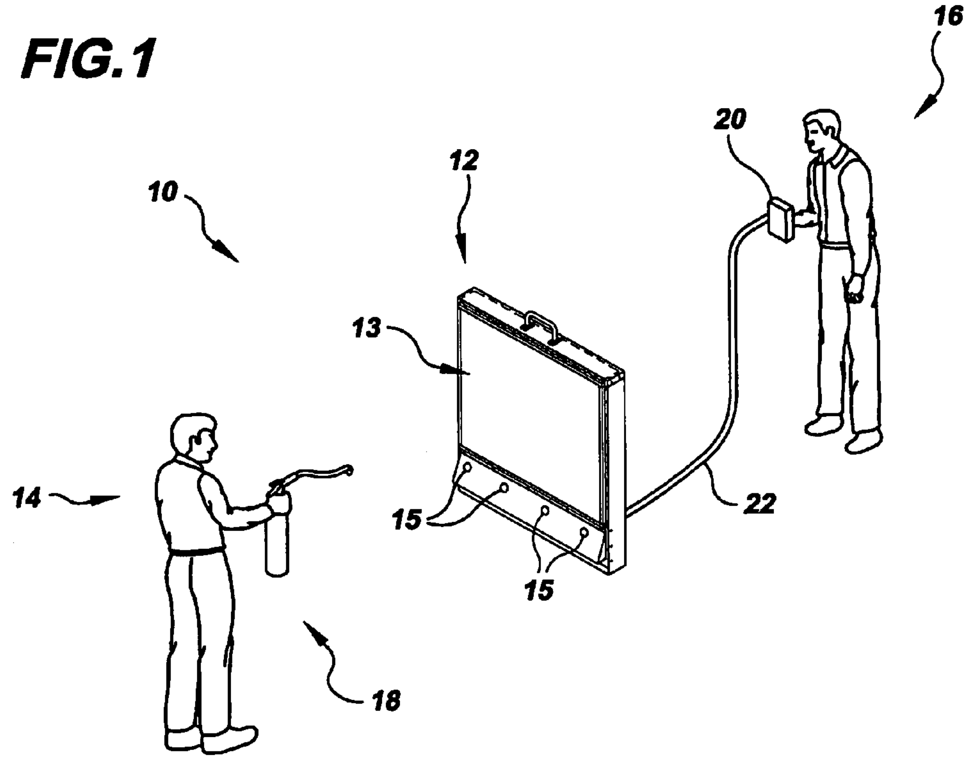
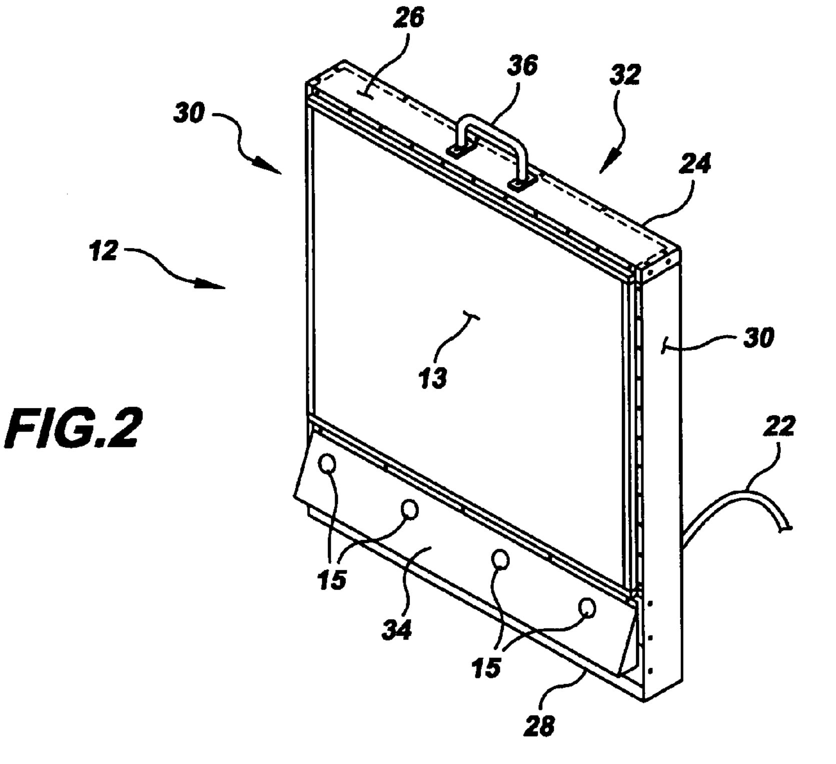
FIG.2

FLAMELESS FIRE EXTINGUISHER TRAINING METHODS AND APPARATUS

TECHNICAL FIELD

The present invention relates to fire extinguisher training methods and apparatus, in particular, flameless fire extinguisher training methods and apparatus comprising electronic control of a simulated flame and sensors adapted to detect the application of extinguishants directed toward the simulated flame.

BACKGROUND OF THE INVENTION

Employing proper technique when using a fire extinguisher can be the difference between survival and death. Though ostensibly simple in operation, the proper use of a fire extinguisher is typically beyond the knowledge of the average citizen. Proper use of a fire extinguisher typically requires training and practice. However, it is often desirable to avoid the creation of an open flame when training or practicing fire extinguisher techniques. For example, it is undesirable to create a flame in certain environments were flames are hazardous, for instance, aboard ship or where combustible materials, for example, petroleum products, are near by. Thus there is a need in the art for fire extinguisher training methods, systems, and apparatus that do not generate a flame, that is, are flameless.

Since the need for proper fire extinguisher training is recognized, there have been many prior art attempts to provide fire extinguisher training devices. However, many of these prior art devices employ some form of open flame. For example, US patent application 2005/0202379; U.S. Pat. No. 5,927,990; and U.S. Pat. No. 5,447,437, among others, all generate some form of open flame. In addition, there have also been attempts in the prior art to provide fire extinguisher training devices that do not generate an open flame. For example, published U.S. patent application 2004/0191736; U.S. Pat. No. 6,129,552; and U.S. Pat. No. 4,001,949, among others, provide fire extinguisher training devices that do not generate open flame. However, many of these prior art methods are characterized by limitations and disadvantages that limit their practical application, for example, requiring large structures that limit portability or not being adaptable to varying fire characteristics that limit their usefulness. Thus, regardless of the strides that have been made to provide effective fire extinguisher training devices, a need still exists for improved methods and devices, for example, improved portable and adaptable methods and devices. Aspects of the present invention overcome many of the limitations and disadvantages of these and other prior art methods and devices.

SUMMARY OF THE INVENTION

Aspects of the present invention provide advantageous methods and apparatus for training, for example, firefighters and other public safety personnel, in the proper handling and use of a fire extinguisher. However, unlike prior art training devices, aspects of the present invention are devoid of any open flame. That is, aspects of the invention may provide fire extinguisher training in environments where open flames are undesirable or hazardous, for example, aboard ship or adjacent flammable material. Aspects of the invention can be used for informal training or for formal training, for example, for certification of firefighters and others.

One aspect of the invention is a fire extinguisher training apparatus including a display adapted to display a varying light pattern simulating a dynamic flame; at least one sensor adapted to detect a stimulus emitted by one of a fire extinguisher and a fire extinguisher simulator and output a signal corresponding to the detected stimulus; and one or more processors adapted to receive the output from the at least one sensor and vary the light pattern simulating the dynamic flame on the display in response to the stimulus detected by the at least one sensor. The display may include a plurality of light source, for example, a plurality of light-emitting diodes (LEDs). In one aspect, the stimulus emitted by one of a fire extinguisher and a fire extinguisher simulator comprises one of an electromagnetic signal, a pressure wave signal, a fluid stream, and a solid particle stream. In another aspect, the apparatus includes a controller adapted to regulate the operation of the apparatus, for example, regulate the operation of the apparatus in compliance with a predetermined algorithm, such as an algorithm corresponding to a U.S. fire class A, class B, class C, class D, or class K fire.

Another aspect of the invention is a fire extinguisher training method including displaying a varying light pattern simulating a dynamic flame; detecting a stimulus emitted by one of a fire extinguisher and a fire extinguisher simulator and generating an output signal corresponding to the detected stimulus; and processing the output from the at least one sensor and varying the light pattern on the display in response to the stimulus detected by the at least one sensor. In one aspect, the method further comprises detecting the orientation of the fire extinguisher or the fire extinguisher simulator and displaying a point of impact of the stimulus on the display.

Another aspect of the invention is a fire extinguisher training apparatus including a display having a plurality of light emitting diodes and a controller adapted to vary illumination of the light emitting diodes to simulate a dynamic flame; a plurality of sensors, for example, mounted adjacent the display, the plurality of sensors adapted to detect a stimulus emitted by one of a fire extinguisher and a fire extinguisher simulator and output a signal corresponding to the detected stimulus; and one or more processors adapted to receive the output from the plurality of sensors and vary the illumination of the light emitting diodes on the display in response to the stimulus detected by the plurality of sensors. In one aspect, the stimulus may be an infrasonic, an audible, or an ultrasonic stimulus.

A further aspect of the invention is a fire extinguisher simulator adapted to emit a stimulus detectable by the fire extinguisher training apparatus recited above, the fire extinguisher simulator including a housing adapted to be held by a trainee; a source of stimulus mounted in the housing; and means for actuating the source of stimulus. In one aspect, the source of stimulus comprises a transmitter adapted to emit electromagnetic radiation, pressure waves, a fluid, or a solid.

A still further aspect of the invention is a fire extinguisher training apparatus including a display adapted to simulate a dynamic flame; at least one sensor adapted to detect a stimulus emitted by one of a fire suppressing device and a fire suppressing device simulator and output a signal corresponding to the detected stimulus; one or more processors adapted to receive the output from the at least one sensor and generate a flame control signal adapted to vary the dynamic flame on the display in response to the stimulus detected by the at least one sensor; and means for varying the generated flame control signal in accordance with at least one predetermined algorithm. In one aspect, the predetermined algorithm may be a plurality of algorithms corresponding to a class of fire, for instance, one or more of U.S. fire class A-D and K or European fire class A-F.

Finally, another aspect of the invention is a fire extinguisher training method including providing a display adapted to simulate a dynamic flame; providing at least one sensor adapted to detect a stimulus emitted by one of a fire suppressing device and a fire suppressing device simulator and output a signal corresponding to the detected stimulus; emitting a stimulus from one of the fire suppressing device and the fire suppressing device simulator; detecting the stimulus from the at least one sensor and generating a sensor output; generating a flame control signal from the sensor output, the flame control signal. adapted to vary the dynamic flame on the display in response to the stimulus detected by the at least one sensor; and varying the flame control signal in accordance with at least one predetermined algorithm. Again, the predetermined algorithm may be a plurality of algorithms corresponding to a class of fire, for instance, one or more of U.S. fire class A-D and K or European fire class A-F.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 1 is a perspective view of a schematic illustration of a system comprising a fire extinguisher training apparatus according to one aspect of the invention.

FIG. 2 is a perspective view of the fire extinguisher training apparatus shown in FIG. 1.

DETAILED DESCRIPTION OF THE INVENTION

Figure 3:
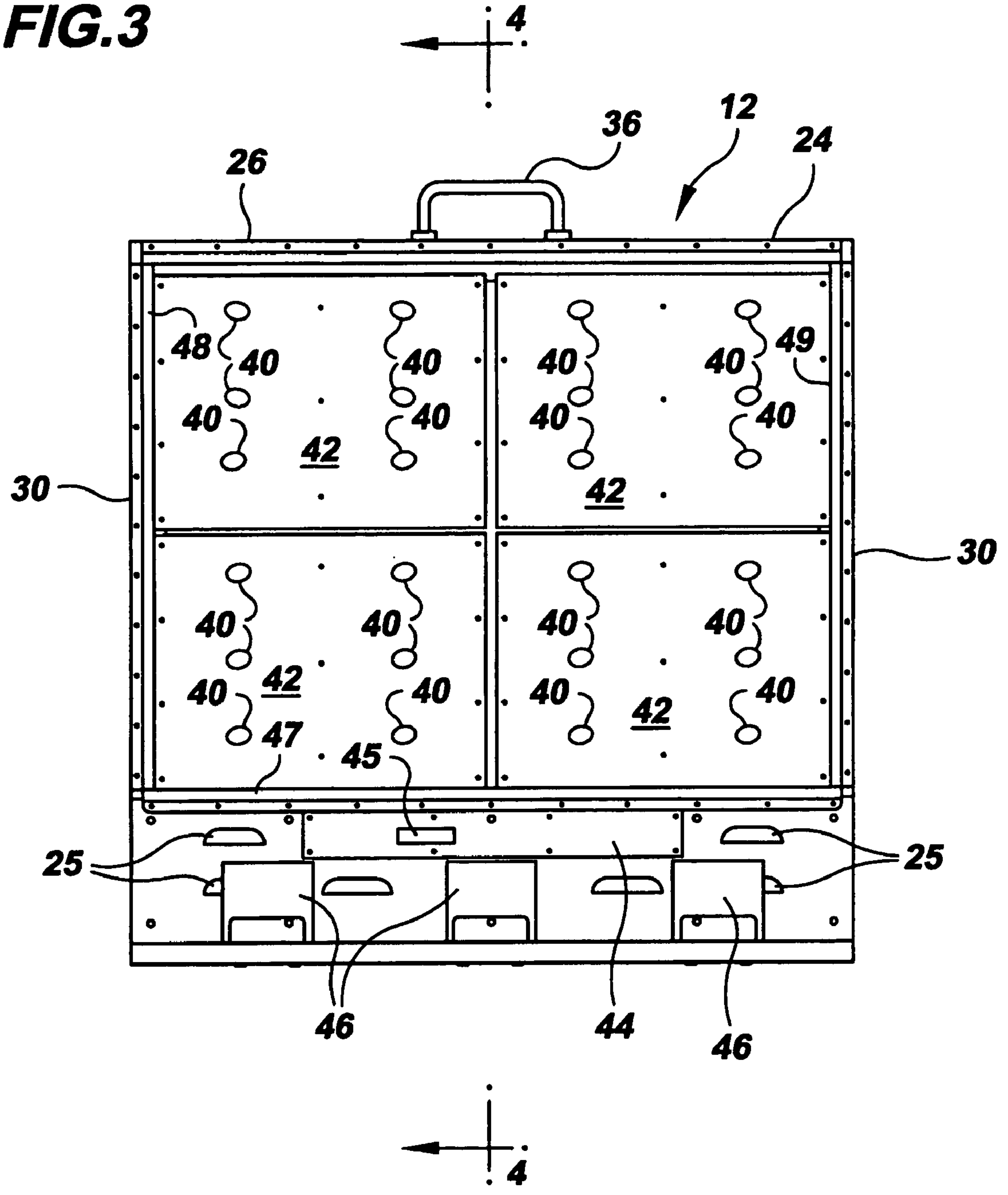
FIG. 3 is a front elevation of the fire extinguisher training apparatus shown in FIG. 2 with front panels removed.

FIG. 1 is a perspective view of a schematic illustration of a system 10 showing a typical use of fire extinguisher training apparatus 12, according to one aspect of the invention, by a user or trainee 14 and a facilitator or trainer 16. As will be discussed below, training apparatus 12 includes a display 13 illustrating a dynamic flame and a plurality of sensors 15. According to this aspect of the invention, trainee 14 manipulates fire extinguisher or fire extinguisher simulator 18 and directs the extinguisher or simulator 18 towards training apparatus 12 and emits a stimulus, for example, a fluid or ultrasonic signal, detectable by sensors 15. According to aspects of the invention, training apparatus 12 is adapted to vary the display of dynamic flame on display 13 in response to the stimulus received from fire extinguisher or fire extinguisher simulator 18, for example, "extinguishing" the flame on display 13 above a sensor 15 that detects an appropriate stimulus from fire extinguisher simulator 18. The operation of training apparatus 12 may be controlled by trainer 16 by means of a controller 20 which may interface with apparatus 12 wirelessly or via a wire or cable 22.

It will be understood that aspects of the invention may be implemented using a fire extinguisher, fire extinguisher simulator 18, any fire suppressing device, or any fire suppressing device simulator. However, to facilitate the following discussion, the term "extinguisher 18" will be used substantially throughout when referring to fire extinguisher, fire extinguisher simulator 18, any fire suppressing device, or any fire suppressing device simulator. It will be understood that reference to "extinguisher 18" may imply an actual fire extinguisher, a fire extinguisher simulator, a fire hose, a fire hose simulator, a fire hose nozzle, a nozzle simulator (for example, the nozzle simulator shown in FIGS. 7-9), combinations thereof, or any device adapted to perform the function or simulate the performance of the function of an actual fire suppression device or fire extinguisher.

FIG. 2 is a perspective view of the fire extinguisher training apparatus or trainer 12 shown in FIG. 1. As shown, trainer 12 may include a housing 24, for example, a sheet metal or molded plastic housing, having a top 26, a bottom 28, sides 30, and a back 32. According to the present invention, trainer 12 includes a display 13 and a sensor panel 34 mounted to the front of housing 24. Sensor panel 34 may include at least one sensor 15, but may typically include a plurality of sensors 15. Trainer 12 also typically includes some form of logic and control system (not shown) that is adapted to regulate and control the operation of the trainer 12, for example, display 13. In one aspect of the invention, trainer 12 is lightweight and portable and can include one or more handles 36 mounted to top 26, sides 30, or back 32 of trainer 12.

According to aspects of the present invention, sensors 15 are provided to detect a stimulus emitted by extinguisher 18, for example, to determine where trainee 14 is aiming the output of extinguisher 18. Though in the aspect of the invention shown in FIGS. 1 and 2, sensors 15 are mounted to training apparatus 12, in one aspect, sensors 15 may be provided anywhere in the vicinity of training apparatus 12 where a stimulus emitted by extinguisher 18 may be detected. For example, one or more sensors 15 may be remote from training apparatus 12 and one or more sensors 15 may be spaced about the vicinity of training apparatus 12, for example, spaced about a room containing training apparatus 12. Through appropriate signal manipulation and/or processing, the remote sensors may be used to determine the relative direction or point of contact of the signal emitted by extinguisher 18 and effect the appropriate variation in flame pattern on display 13. One or more sensors 15 may detect any stimulus emitted by extinguisher 18, for example, extinguisher 18 may emit and sensors 15 may detect a wavelength of radiation within the electromagnetic spectrum, for example, visible light, radio waves, or microwaves; a pressure wave, for example, a sonic signal, simply the noise generated by extinguisher 18, or a voice command from trainee 14 or trainer 16; a fluid emitted by extinguisher 18, for example, a fire extinguishing agent, such as water, an air-water mixture, carbon dioxide, sodium bicarbonate, cornstarch; a fluid simulating an extinguishant; a solid, for example, a solid particulate; and combinations thereof. The class of radiation within the electromagnetic spectrum that may be detected by sensors 15 includes, but is not limited to, ultraviolet (UV), visible, infrared (IR), far infrared, microwaves, and radio frequency (RF), and combinations thereof. According to the present invention, the term "sonic" includes any stimulus transmitted by compression waves in a medium, such as air, for example, from the infrasonic waves, to audible waves (about 20 to about 20,000 Hz), to ultrasonic waves. In one aspect of the invention, sensors 15 may comprise ultrasonic sensors, for example, piezoelectric ultrasonic sensors provided by Murata Manufacturing Company, or their equivalent.

In one aspect, the sensors 15 may also be adapted to detect audible directives, for example, verbal directives from trainee 14 or trainer 16. Audible directives may include but are not limited to oral/verbal directives given by trainee 14 or trainer 16 or by an artificial voice synthesizer/digital voice. Sensors 15 or trainer 12 in general may also be adapted to receive electronic-based directives or orders, such as those that can be given by computer, minicomputer, or a personal digital assistant (PDA). In addition to the pressure waves mentioned above, in one aspect, sensors 15 may be adapted to detect wave patterns, for example, repeating patterns of high pressure and low pressure regions moving through a medium, for instance, as can be provided by sound patterns or vibration patterns emitted by a fire suppressing device, such as a fire extinguisher.

Figure 4:
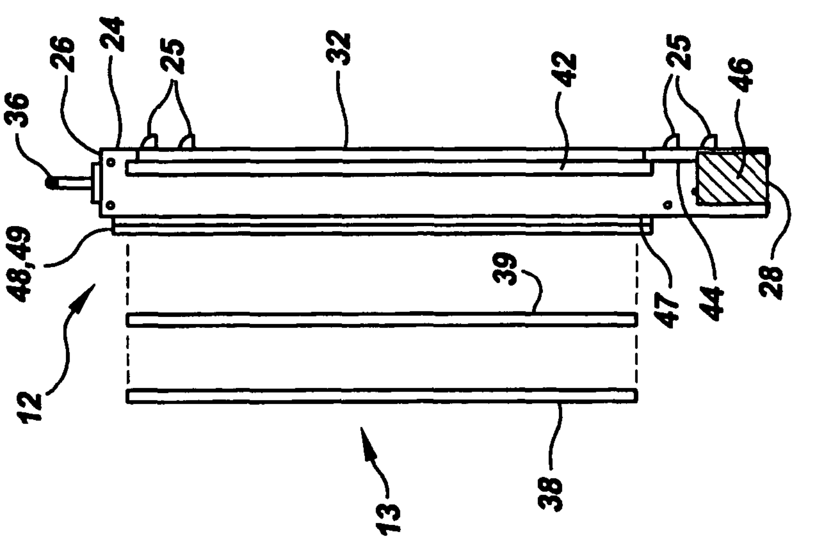
FIG. 4 is a cross section of the fire extinguisher training apparatus shown in FIG. 3 as viewed along section lines 4-4 in FIG. 3.

The one or more sensors 15 mounted to sensor mounting panel 34 communicate with the control and logic system of trainer 12. The communication between sensors 15 and the control and logic system may be wired or wireless communication The invention includes a display screen or panel, for example, one or more modular display screens or panels, which may be connected in series and/or in parallel with a logic and control system of trainer 12. Each display panel contains numerous light sources (for example, LEDs that may be of the same or different color) arranged in a two- or three-dimensional array. In one aspect, a 3-dimensional array may be provided by a plurality of 2-dimensional arrays. These light sources may be illuminated in accordance with one or more simulated flame generation algorithms that are determined by the logic and control system in trainer 12. FIG. 3 is a front elevation of trainer 12 shown in FIG. 2 with front panel 13 and sensor panel 34 removed to expose the internal structures of trainer 12. FIG. 4 is a cross section of trainer 12 shown in FIG. 3 as viewed along section lines 4-4 in FIG. 3. In FIG. 4, front panel 13 is shown in an exploded view as a plurality of panels 38 and 39.

As shown in FIG. 3, according to aspects of the invention, trainer 12 includes a least one, but typically, a plurality of light sources 40, for example, a plurality of light sources 40 evenly distributed about the inside of housing 24, for instance, evenly distribute behind panel 13. In another aspect, panel 13 may comprise light guides, a CRT, a monitor, for example, flat screen monitor, or a liquid crystal display, among other types of displays, upon which a varying light pattern may be displayed. Light sources 40 may be mounted on one or more panels 42 mounted in housing 24, for example, by means of conventional mechanical fasteners. Light sources 40 may comprise incandescent lights, fluorescent lights, electroluminescent lights (that is, "EL" lights), plasma lights, lasers, or light emitting diodes (LEDs). In one aspect of the invention, panels 42 may be printed circuit boards (PCBs) and light sources 40 may comprise a plurality of LEDs mounted to PCBs 42. In one aspect, training apparatus 12 may include from about 1 to over 5 million light sources 40, for example, LEDs evenly distributed about one or more PCBs 42. Training apparatus 12 may include about 100 to about 100,000 LEDs, for example, between about 500 and about 2000 LEDs. For example, in one aspect, an array of 11×14 LEDs evenly spaced at a 1-inch horizontal and vertical pitch may be mounted on panels 42. One such panel may be a part number FPP-1 provided by BullEx Digital Safety of Menands, N.Y.

As shown in FIG. 3, trainer 12 also includes a PCB 44 containing hardware comprising the control and logic system of trainer 12. The control and logic system on PCB 44 receives input from sensors 15 and directs corresponding output signals to light sources 40 to display the appropriate flame pattern on display 13. The control and logic system may generate a flame control signal from the input from sensors 15 where the flame control signal is adapted to vary the dynamic flame on display 13 in response to the stimulus detected by sensors 15. In one aspect, the flame control signal may be varied in accordance with at least one predetermined algorithm, for example, an algorithm associated with a type of fire (class A, B, etc.). The control and logic system on PCB 44 may also be adapted to receive external input, for example, from one or more controllers 20 or other trainers 12. The control and logic system on PCB 44 may also be adapted to direct output to other auxiliary devices such as smoke generating devices, printers, or other displays.

According to the present invention PCB 44 may include an interface for receiving signals from sensors 15, appropriate logic and control devices 45, and an interface with the light sources 40. The logic and control devices 45 may include a central processing unit (CPU), random access memory (RAM), read only memory (ROM), an internal memory storage device, software, and functional algorithms and the like. The CPU interprets the inputs from sensors 15 based upon internal programming and set parameters, and automatically provides an output to light sources 40 in response to the inputs. Parameters used to evaluate the sensor inputs may include, but are not limited to, inputs received per unit time, total number of inputs per total training time, user distance from trainer 12, user location relative to trainer 12, the direction of orientation or aim of the fire extinguisher 18, and the like. If the control unit determines the trainee 14 is using the correct technique to extinguish the simulated fire, an output is automatically provided. The plurality of light sources 40 may be controlled by a microprocessor (not shown) mounted on PCB 44, mounted on PCB 42, or mounted elsewhere in housing 24.

Trainer 12 may also include one or more power supplies 46, though in one aspect of the invention, power may be provided by an external means, for example, from a wall outlet or dedicated external power supply. The power supplies 46 may comprise conventional batteries, for example, sealed lead acid batteries provided by Power-Sonic Corporation, or their equivalent. As shown in FIGS. 3 and 4, housing 24 may include one or more vents 25 to allow generated heat to escape from housing 24. In one aspect, housing 24 may include one or more cooling fans (not shown) to enhance the removal of heat from the inside of housing 24.

As shown in FIG. 4, front panel 13 may comprise one or more transparent or translucent panels 38 and 39. According to the present invention, panels 38 and 39 are adapted to vary the direction of the light emitted by light sources 40, for example, to enhance the realism of the simulated light display provided by trainer 12. The effect of panels 38 and 39 on the path of the light emitted by sources 40 may be similar or different. For example, in one aspect, both panels 38 and 39 may diffuse the light or focus the light emitted from light sources 40. In another aspect, the effect of panels 38 and 39 may be different, for example, inner panel 39 may first diffuse the light emitted from light sources 40 and then outer panel 38 may further diffuse or spread the light out after diffusion by inner panel 39. One or more panels 38, 39 may be used to provide a desired flame display, for example, 3 or more, or 5 or more panels. Panels 38 and 39 may be made from glass or plastic, for example, a translucent or transparent polyamide (PA), for example, nylon; a polyamide-imide; a polyethylene (PE); a polypropylene (PP); a polyester (PE); a polytetraflouroethylene (PTFE); an acrylonitrile butadiene styrene (ABS); a polycarbonate (PC); or a vinyl, such as, polyvinylchloride (PVC), among other plastics. Panels 38 and 39 may be mounted to housing 24 by conventional means, for example, by means of mechanical fasteners or panels 38 and 39 may engage channels in housing 24, for example, elongated horizontal channel 47 and vertical channels 48 and 49 in housing 24. In one aspect, outer panel 38 may be a polystyrene panel and inner panel 39 may be a polycarbonate panel, for example, lens covers typically provided for banks of fluorescent lights.

In addition to displaying a flame pattern, display 13 may also display alphanumeric information, for example, trainee performance measurement data, current training trial number, training settings, trainee or trainer identification, trainee expertise level, trainer expertise level, and the like.

Figure 6:
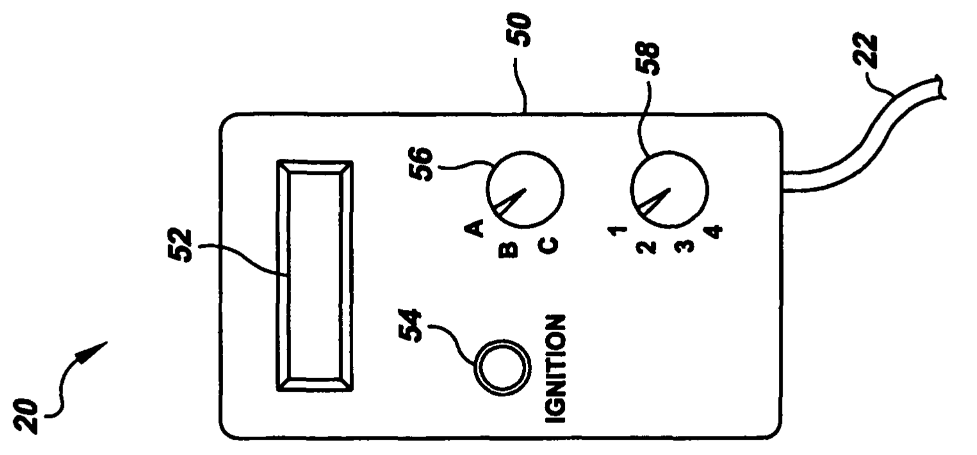
FIG. 6 is a front elevation view of the controller shown in FIG. 5.
Figure 5:
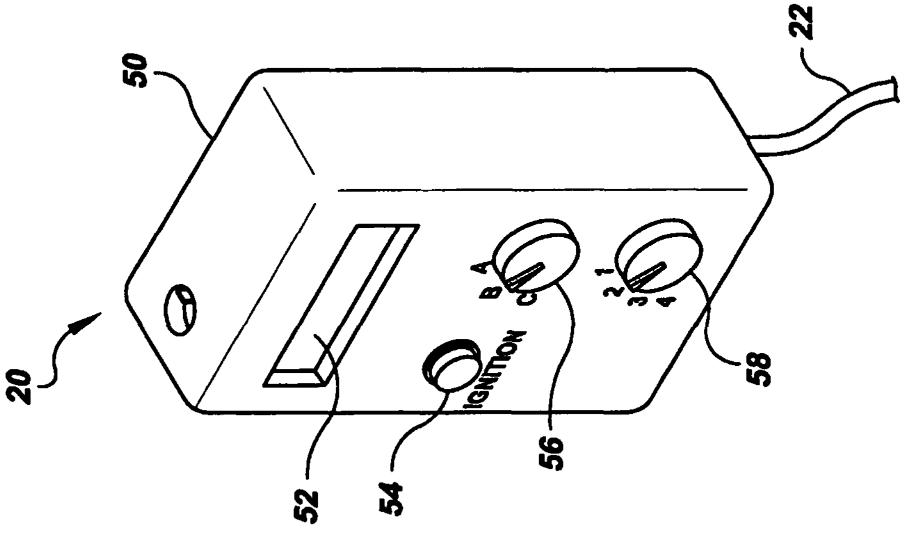
FIG. 5 is a perspective view of a controller shown in FIG. 1 according to another aspect of the invention.

FIG. 5 is a perspective view of controller 20 shown in FIG. 1 according to another aspect of the invention. FIG. 6 is a front elevation view of controller 20 shown in FIG. 5. As described above, controller 20 may be used to remotely control the operation of trainer 12, though in one aspect, controller 20 may be mounted in, on, or to the housing 24 of trainer 12. As shown in FIG. 1, controller 20 may interface with the logic and control system on PCB 44 of trainer 12 via cable or wire 22 or wirelessly, for example, by radio or microwave transmission. One or more controllers 20 may be provided. At least one, but typically all the command and control parameters and program selection for trainer 12 may be input via controller 20.

As shown in FIGS. 5 and 6, controller 20 includes a housing 50, for example, a molded plastic housing, for instance, an ABS or a polycarbonate. The housing may include a display 52, for example, alphanumeric liquid crystal display, and at least one button or knob for trainer input. For example, controller 20 may include an ignition button 54 that energizes trainer 12 and initializes the logic and control system on PCB 44 for subsequent trainer input. Controller 20 may also include at least one knob 56 to vary the algorithm that controls the operation of trainer 12 and the response of the logic and control system to the stimulus detected by sensors 15. For example, knob 56 may vary the control algorithm to simulate a flame typical of a U.S. class A, B, C, D, or K type fire and/or a European class A, B, C, D, E, or F type fire. Controller 20 may also include at least one knob 58 to vary the algorithm that controls the operation of trainer 12 and the response of the logic and control system to the level of performance of the trainee, for example, a beginner may be exposed to a fire extinguisher training algorithm of level I while a seasoned firefighter may be exposed to an algorithm of level 4. Other trainer inputs may also be provided for inputting length of training time, name of trainee or trainer, and trainee personal data, among other things. Controller 20 may typically include a CPU, RAM, ROM, and an internal memory storage device, among other devices.

Controller 20 may be adapted to control one or more attributes of the simulated flame displayed on display 15. For example, controller 20 and the logic and control system on PCB 44 may be adapted to display and control the simulation of various types of fires, for instance, a class A fire, a class B fire, a class C fire, and the like. Attributes of each type of fire that may be regulated include, but are not limited to, flame shape, flame height, flame volume, burn rate, growth rate, extinguishing ease, flashover, visual effects, and combinations thereof. Control of other parameters via a selection of various preprogrammed algorithms or scenarios may also be programmed into the logic and control system of training apparatus 12.

Controller 20 and the logic and control system on PCB 44 may include one or more expansion ports to allow trainer 12 to communicate with other devices, for example, other trainers 12, controllers 20, and auxiliary devices, among other devices. Data changes, parameter changes, programming changes, and the like may be received and transmitted between controller 20 and PCB 44 and any device interfaced with trainer 12. The logic and control system on PCB 44 may include interfacing ports such as USB ports, pin ports, jacks, and the like, for example, for connecting temporary or flash memory devices. Such devices include, but are not limited to, flash drives, external memory storage and transfer devices, and the like.

Controller 20 and the logic and control system on PCB 44 may include communication ports that allow trainer 12 to communicate information such as user performance, current training trial number, training settings, trainee identification, trainer identification, trainee expertise level, trainer expertise level, and the like to media other than the display or the hand-held control device. Such media include, but are not limited to, printers, other computer terminals, scoreboards, and electronic display boards, other hand-held devices such as a personal digital assistant (PDA), a cell phone, a Blackberry-type device, and combinations thereof.

The logic and control system on PCB 44 typically also communicates with a simulated flame generation unit associated with light sources 40. The simulated flame generation unit controls the energizing of light sources 40 in response to commands received from the logic and control system on PCB 44. The logic and control system may communicate with the simulated flame generation unit via a cable or wirelessly, but in one aspect, the simulated flame generation unit may also be mounted on PCB 44, for example, as a single piece of hardware.

One aspect of the present invention is a flame suppression apparatus that simulates the visual, audio, and/or tactile effects of discharging an actual fire extinguisher without the cleanup and hazardous conditions that may typically result. The apparatus may simulate the physical characteristics of a real fire extinguisher such as weight, shape, mechanical movement, and inertia. The apparatus may also incorporate a simulated discharge ability such as being able to project or create the illusion of projecting a substance that would allow the user to see where the user would be extinguishing if they were using a real fire extinguisher.

In one aspect of the invention, any stimulus emitting device or transmitter may be provided that can emit a stimulus that is detectable by sensors in training apparatus 12, for example, sensors 15. This transmitter may be an isolated individual transmitter or may be mounted to or operatively adapted to a fire suppression device to simulate the use of the fire suppression device. In one aspect, the fire suppression device to which a transmitter may be mounted may include a fire extinguisher, a simulated fire extinguisher, a fire hose, a simulated fire hose, a hose, a simulated hose, or combinations thereof. The expression "operably adapted" may mean, for example, that the transmitter may be configured or mounted to the fire suppression device such that the user of the fire suppression device is capable of activating the transmitter. In another aspect, the transmitter may be integrated into any of the fire suppression devices mentioned above. Integration of the transmitter into a fire suppression device may not be limited to integration into a fire extinguisher or fire hose but may include integrated into any part of a fire suppression device. For example, a transmitter may be mounted, for instance, removably mounted, to a fire suppression device, by conventional means, for example, by mechanical fasteners, welding, a snap fit, or by an adhesive, such as glue, epoxy resins, or adhesive tape, among other means. One means of providing a transmitter integrated into a fire suppression device according to one aspect of the invention is illustrated in FIGS. 7-9.

Figure 7:
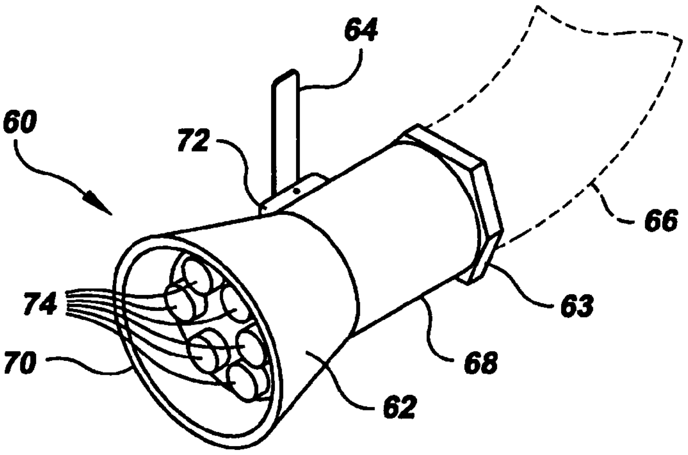
FIG. 7 is a perspective view of a nozzle simulator according to another aspect of the invention.

FIG. 7 is a perspective view of a nozzle simulator 60 according to another aspect of the invention. Nozzle simulator 60 functions to emit a stimulus that is detectable by a training apparatus, for example, trainer 12 shown in FIGS. 1-4, to assist in the training of, for example, a safety professional, in the proper use of a fire extinguisher. FIG. 8 is a top plan view of nozzle simulator 60 shown in FIG. 7 and FIG. 9 is a cross sectional view of nozzle simulator 60 shown in FIG. 8 as viewed along section lines 9-9 in FIG. 8. Nozzle simulator 60 includes a housing 62 and an actuator 64, for example, a lever actuator, positioned and shaped to mimic the appearance of a conventional fire fighting hose nozzle and actuator, for example, a Quadra Fog nozzle provided by Task Force Tips, Inc., or its equivalent. Simulator housing 62 may include a hex-nut-type structure 63 to further simulate the appearance of an actual fire hose nozzle. Simulator 60 may also include a length of fire hose 66 (shown in phantom) and fire hose 66 may be weighted to simulate a water filled hose, though in one aspect, no fire hose may be provided. According to aspects of the present invention, simulator 60 does not discharge water or flame retardants, but is adapted to emit a stimulus, for example, electromagnetic radiation or pressure waves (for example, infrasonic, audible, or ultrasonic waves) that can be detected by a training apparatus, for example, trainer 12 shown in FIGS. 1-4.

Figure 8:
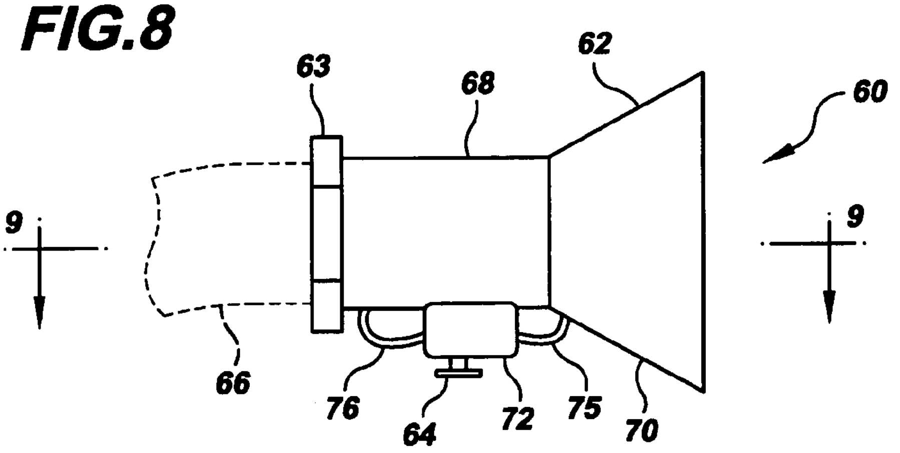
FIG. 8 is a top plan view of the nozzle simulator shown in FIG. 7.
Figure 9:
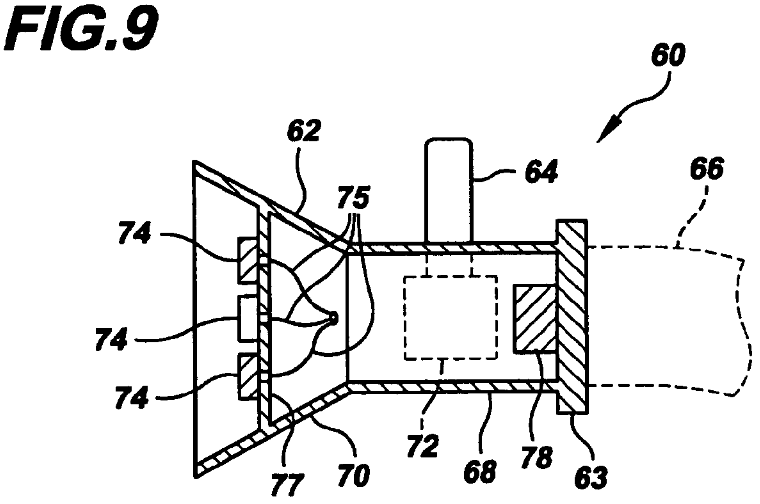
FIG. 9 is a cross sectional view of the nozzle simulator shown in FIG. 8 as viewed along section lines 9-9 in FIG. 8.

As shown in FIGS. 7-9, housing 62 of simulator 60 may include a cylindrical section 68 and a conical section 70, again, mimicking a conventional fire hose nozzle. Housing 62 may be metallic, for example, brass or steel, or plastic; for example, one or more of the plastics listed above. However, unlike conventional fire hose nozzles, simulator 60 includes an actuator transducer 72 and at least one transmitter 74 adapted to emit a signal upon actuation of actuator transducer 72 by actuator 64. For example, transducer 72 may be a potentiometer, the resistance of which is varied by the movement of actuator 64 whereby an electric signal, for example, a 4-20 mA signal or a 0-1 VDC signal, is transmitted to and activates one or more transmitters 74 via a cable or wire 75. Transmitters 74 may be mounted in a plate 77 which may be mounted in conical section 70 of housing 62. Transducer 72 may receive power from wire or cable 76, for example, from an external power source or from one or more internal batteries 78 (see FIG. 9).

The one or more transmitters 74 may be electromagnetic energy transmitters, for example, radio or microwave transmitters, or pressure wave transmitters, for example, infrasonic, audible, or ultrasonic transmitters. Though six equally spaced transmitters 74 are shown in FIG. 7, one or more transmitters may be used, for example, 3 or more equally spaced transmitters may be used. In one aspect, the one or more transmitters may be piezoelectric ultrasonic transmitters provided by Murata, or their equivalent.

Another aspect of the invention includes at least one modified flame suppression device that may release a substance comprising an actual extinguishant, any substance that will simulate actual extinguishant, or a stimulus characteristic of an actual extinguishant. The simulated or actual extinguishant may include a gas, such as air; a mixture of air and water vapor; a commercially available "smoke" product; a solid, such as, a dust or powder; or any other visible fluid. When a mixture is used, the mixture may be pre-mixed, or mixed at any point before, during, or after the escape of components of the mixture from the holding tank or vessel for the components. The release of the extinguishant from the fire extinguisher or the simulated fire extinguisher may be effected by a plurality of mechanisms, such as pressurized air or a pumping device. In one aspect, when the extinguishant includes an air and water mixture, a water reservoir may be provided to provide a source of water. Water may be provided as a liquid or vapor. The water may be carried using a pressurized hose, self pressurized tank, pressurized air when the user compresses the extinguisher handle, a siphon mechanism, or pumping mechanism. Multiple flame suppression devices, such as extinguishers, may be used, simulating the need to choose between U.S. class A, B, C, D, or K type extinguishers and/or a European class A-F type extinguisher for the type of fire. The simulated effect of these extinguishers may be a function of the type of fire simulated, and the type of extinguisher used.

Figure 10:
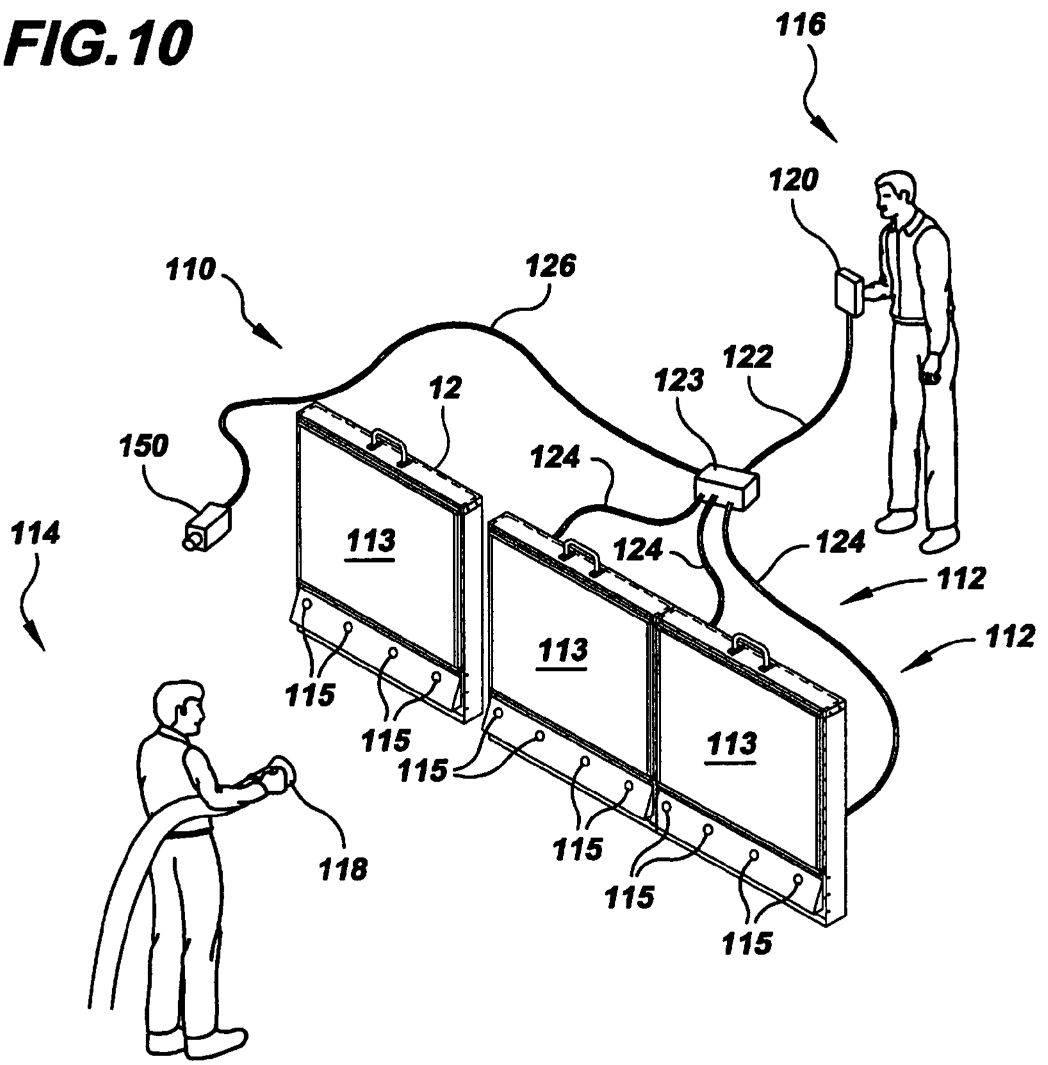
FIG. 10 is a perspective view similar to FIG. 1 of a schematic illustration of a system according to another aspect of the invention.

FIG. 10 is a perspective view similar to FIG. 1 of a schematic illustration of as system 110 having one or more fire extinguisher training apparatus 112, according to one aspect of the invention, employed by user or trainee 114 and/or a facilitator or trainer 116. Unlike system 10 shown in FIG. 1, system 110 may include a plurality of trainers 112, providing a plurality of displays 113 illustrating a dynamic flame and a plurality of sensors 115. The plurality of trainers 112 may be positioned adjacent to or at a distance from each other, for example, in separate rooms or in separate distant locations (and may communicate over the internet or some other wired or wireless communication system). According to this aspect of the invention, trainee 114 manipulates fire extinguisher or fire extinguisher simulator 118, for example, having a nozzle simulator 60 shown in FIGS. 7-9, and directs the extinguisher 118 towards the plurality of trainers 112 and emits a stimulus detectable by sensors 115. Again, the stimulus emitted by extinguisher 118 and detected by sensors 115 may be an electromagnetic stimulus, a pressure wave, sonic wave, a solid, or a fluid, as discussed above. According to aspects of the invention, training apparatus 112 may comprise all the features and characteristics of trainer 12 shown and described with respect to FIGS. 1-4. The operation of system 110 may be controlled by trainer 116 by means of one or more controllers 120 which may interface with apparatus 112 wirelessly or via a cable 122, a junction box 123, and cables 124. In one aspect, instead of multiple trainers 112, one or more trainers 112 may communicate with multiple displays 113. In another aspect, display 113 of trainer 112 may comprise a single large display, for example, encompassing one or more walls or a ceiling of a room.

In one aspect of the invention, system 10 (or system 10 of FIG. 1) may include auxiliary equipment to enhance the realism of the training experience, for example, a smoke generating device, a sound generating device (for example, projecting the sounds of an engulfed structure, the calls from trapped victims, or an evacuation signal, such as an evacuation horn), further lighting effects, or other special effects to enhance the training experience. For example, as shown in FIG. 10, system 110 may include one or more smoke generating devices 150. As shown in FIG. 10, an auxiliary device, such as smoke generating device 150, may interface with system 110 wirelessly or via junction box 123 and cable 126.

Figure 11:
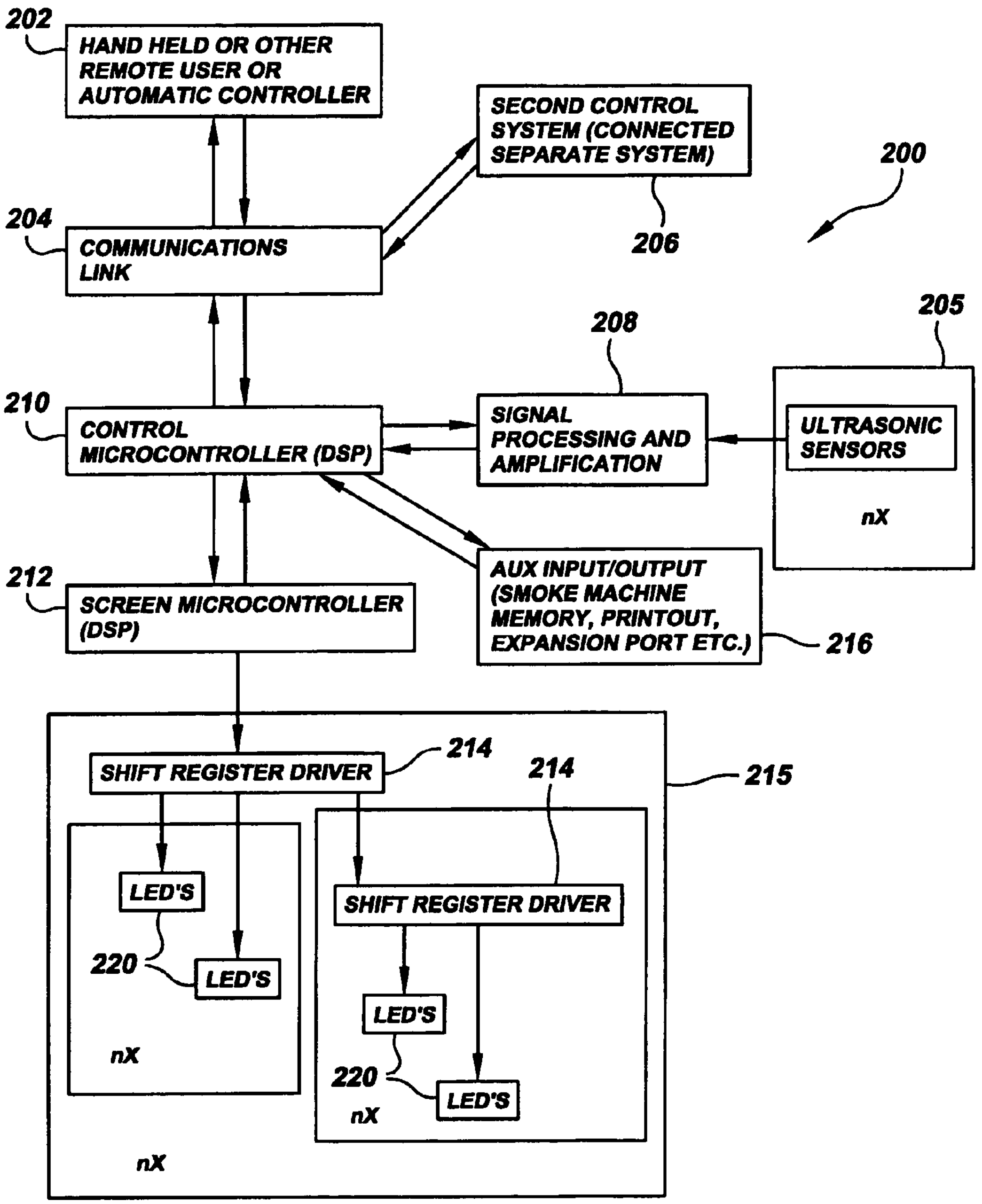
FIG. 11 is a schematic flow diagram of the hardware operation of another aspect of the invention.

FIG. 11 is a schematic flow diagram 200 of the hardware operation according to aspects of the invention, for example, for systems 10 and 110 shown in FIGS. 1 and 10, respectively. As shown in FIG. 11, the principle components of systems 10 and 110 are the plurality of sensors 205, for example, ultrasonic sensors; one or more processors 210, for example, microcontroller that implements digital signal processing (DSP); and a simulated flame display 215, for example, having a plurality of evenly spaced LEDs or other light sources 220. As is typical of aspects of the present invention, processors 210 may implement a conventional feedback control loop, for example, a Proportional-Integral-Derivative (that is, PID) control loop, to vary the simulated flame on display 215 in response to the stimulus detected by sensors 205 and one or more predetermined algorithms. These devices may be augmented with additional devices to provide enhancements to the present invention.

For example, flow diagram 200 includes a controller 202 that interfaces with processor 210 via communications link 204. Controller 202 may comprise a controller such as controllers 20 and 120 described above and include all the attributes and characteristics of controllers 20 and 120, for example, include trainer input and output of trainee performance. Communications link 204 may be a conventional communications link, for example, an RS-485 transducer and cable or, when wireless communication is desired, a Linx Wireless Radio transceiver module, or their equivalent.

Diagram 200 also includes the option of interfacing with additional systems or controllers 206 via communications link 204, for example, links to one or more other controllers 202 or processors 210.

The signals transmitted by sensors 205 may be amplified or otherwise processed by a signal processor 208 prior to being forwarded to processor 210. Signal processor 208 may include frequency filtering, phase filtering, and amplification of the signals received and transmitted by sensors 205. Signal processor 208 may comprise an off-the-shelf processor or discrete components, such as op-amps, etc., such as TL084 Op-amps provided by Texas Instruments, or their equivalent.

The output from processor 210 may be transmitted to display 215 via a screen or display controller 212, for example, a microcontroller. In one aspect of the invention, controller 212 may be associated with or integral with processor 210 or be associated with or integral with display 215. Controller 212 may comprise a 56800 series Microcontroller/DSP Hybrid controller provided by Motorola, or its equivalent. Display 215 may include one or more shift register drivers 214 to drive the operation of the light sources 220, for example, LEDs.

As shown in FIG. 11, auxiliary input and output devices 216 may also be interfaced to the system via processor 210. For example, smoke generating devices (as shown in FIG. 10), digital storage devices, memory devices, expansion ports, and input and output devices (such as displays or printers) may be included.

According to one aspect of the invention, the logic and control system of training apparatus 12 or 112 may comprise a feed-back control loop style of control comprising at least one of proportional control loop, an integral, and a derivative control loop (that is, a PID-type control loop). The output of the control loop may represent the various strengths of the simulated flame for predefined areas of display 13 or 113 for example, predefined arrays or columns of LEDs. For instance, an output level of 30% from the control loop can correspond to any mapping of display 13, for example, 30% of the LEDs in one or more columns in an LED array. For example, in one aspect, a 30% control output level may correspond to a 10% simulated flame level for a class B fire simulation. The input to the control loop of the logic and control system may typically be at least one input from the one or more sensors 15 or 115, an input from a signal processing system, an input from external controller 20 or 120, an input from the trainee 14, 114 or trainer 16, 116, a stimulus from extinguisher 18, 118, or an input from another control loop running within the apparatus 12 or in the vicinity of the apparatus 12. The logic and control system may also include end points for the control loop that determine where the output must be for the invention to consider that the simulated flames have been extinguished. For example, these end points may be used in such a way that a 20% control output endpoint may be set for a class A fire to be considered extinguished, or a 2% control output endpoint may be required for a class B fire to be extinguished. Other endpoint values may be provided for other class fire simulations or other flame simulations. The coefficients for one or more of the control settings may be changed dynamically to represent, for example, different classes of fire, varying training difficulty, or simulation parameters. In one aspect, the dynamics and response of a various classes of fire can be characterized by different PID loops and output/input mappings. For instance, the logic and control system may be able to change or vary the control loop settings and mappings that are used to generate a simulated fire to allow users to train and familiarize themselves to the characteristics of different classes of fire. The characteristics and responses of these different classes of fire to extinguishant and natural growth, as well as smoke parameters, etc. are typically known in the art and can be incorporated into the logic and control system as desired.

According to one aspect of the invention, a portable fire extinguisher training apparatus is provided and may be operated in the following manner. The following discussion will reference system 10 shown in FIG. 1, but other aspects in other figures may be referenced to facilitate the description of the invention. First, controller 20 may be used to activate training apparatus 12, for example, by depressing the ignition switch 54 shown in FIGS. 6 and 7. The logic and control system in training apparatus 12 then prompts the user through display 52 in controller 20 or display 13 to select the parameters or test programs to be used in the training session. The user may be trainee 14 or trainer 16. In this example, trainee 14 is the user and the trainer 16 is conducting the training session. Parameters that may be selected via controller 20 or display 13 may include, but are not limited to, the date, time, trainee identification, trainer identification, trainee experience, stimulus used (for example, ultrasonic or radiographic), flame height, burn rate, training time, input sensitivity, type of fire or extinguisher (that is, A, B, C, etc. ), degree of difficulty desired, and the like. In one aspect, any devices in communication with the logic and control system on PCB 44 via the communication ports that has the appropriate software, identification codes, or logic system may be capable of providing the trainee or trainee input or conducting the training session.

In this exemplary training session according to one aspect of the invention, the extinguisher 18 used by trainee 14 comprises the hose nozzle simulator 60 shown in FIG. 7-9 having transducer 72 and one or more ultrasonic transmitters 74.

Simulator 60 may be mounted to a water filled fire hose, for example, as shown in FIG. 10. Alternatively, in another aspect, trainee 14 may manipulate an actual fully charged fire extinguisher and the noise resulting from the expulsion of a fire-extinguishing agent when the fire extinguisher lever is depressed can provide the stimulus detected by sensors 15 on trainer 12.

Trainer 16 may initiate the training session by inputting the appropriate command into hand-held controller 20 and controller 20 forwards a signal to the logic and control system of trainer 12 to ignite a simulated flame on display 13 according to the desired protocol algorithm. The actual training of trainee 14 may start when trainer 16 signals trainee 14 (for example, with a visual or audible signal or a count down on display 13) to begin extinguishing the fire. Trainee 14 then picks up extinguisher 18 having simulator 60, rotates the extinguisher simulator lever 64 effectuating the operation of transmitters 74 (optionally trainee 14 may pull the pin of an actual fire extinguisher), and transmits an ultrasonic signal simulating a fire extinguishant toward trainer 12. In another aspect, no transmitter 74 may be used, but the directional noise of expelling extinguishant provides the stimulus directed toward trainer 12. As trainee 14 is aiming the simulator 60 toward the simulated flame on display 13, the transmitters 74 emit a signal in substantially the same direction as an actual nozzle is aimed. In another aspect, the stimulus emitted by extinguisher 18 may be characterized by not providing a stimulus in the desired direction, but in substantially all other directions. For example, fire extinguisher 18 may "illuminate" (that is, with any form of electromagnetic radiation) substantially the entire display 13, but not illuminate the point of contact or the point of direction of extinguisher 18. The sensors and logic and control system of training apparatus 12 may be provided accordingly to detect and display the resulting flame pattern.

In one aspect, in order to extinguish the simulated fire, trainee 14 aims the extinguisher 18 toward the base of the flame display, for example, in the direction of sensors 15, and moves extinguisher 18 back and forth in a lateral motion. This back and forth motion is one technique used to extinguish a fire in a real life emergency situation and, in this example, is the technique that is programmed for this particular training session. As extinguisher 18 is swept back and forth in lateral motion, using the aforementioned technique, the signals emitted by transmitters 74 contact the sensors 15 on trainer 12. Sensors 15 detect the ultrasonic signals transmitted by transmitters 74 and communicate to the logic and control system on PCB 44 that inputs, the transmitted signals, are being received by sensors 15. The logic system of the logic and control system interprets the inputs from sensors 15 based upon internal programming and set parameters, and automatically provides an output in response to the sensor inputs. Parameters used to evaluate the inputs may include, but are not limited to, inputs received per unit time, total number of inputs per total training time, user distance from trainer 12, and the like, or waveform shape, size, or frequency. If the control unit of trainer 12 determines that trainee 14 is using the correct technique to extinguish the simulated flame, an output is automatically provided to the flame display controller to decrease the flame size subsequently causing the "flame" displayed on display 13 to decrease in size, for example, to de-energize one or more LEDs. If trainee 14 continues to use the current fire extinguishing technique loaded into the control system of trainer 12, the control system will continue to receive inputs and continue to automatically provide outputs in response, that is, commanding the simulated flame controller to decrease the flame size, and eventually stop the flame simulation completely. According to aspects of the invention, this mode of operation provides trainee 14 with immediate qualitative feedback on his or her training performance. If trainee 14 uses the correct fire extinguishing technique, the simulated flame will decrease in size and eventually be extinguished.

According to aspects of the invention, should trainee 14 use an incorrect fire extinguishing technique, the logic and control system of trainer 12 will instruct the flame control system to not decrease the size of the flame, but may actually increase the size of the flame (for example, energize more LEDs) until trainee 14 applies the proper technique. If, during the training session, trainee 14 does not aim extinguisher 18 toward the base of trainer 12 and move extinguisher 18 in a back and forth lateral motion, the ultrasonic signals emitted by simulator nozzle 60 may not contact the sensors 15 or the ultrasonic signals may only contact sensors 15 intermittently, or the input received by sensors 15 may not contain the proper wave information reflective of a proper technique. In such cases, the control system may determine that trainee 14 is using the incorrect technique to extinguish the flame, and the control system may direct the flame controller to maintain or increase the size of the flame displayed. If trainee 14 continues to use the incorrect fire extinguishing technique, the control system may continue to receive inputs and continue to automatically provide outputs in response, that is,. commanding the flame display controller to simulate flames at substantially the same or maximum size until trainee 14 uses the correct technique.

During or after a training session, training apparatus 12 may provide output to trainee 14 and/or trainer 16. This output may be displayed on controller 20 or on display 13 and may include performance measurements of trainee 14 undergoing training, for example, an overall trainee performance score, training completion time, performance history, remaining extinguishant, aiming accuracy, difficulty levels passed, and percent improvement, among others. In addition to displaying output on controller 20 and/or display 13, performance data may be displayed on any available output device wired or wirelessly communicating with training apparatus 12 including, but not limited to, printouts, e-mails, text messages, scoreboard displays, electronic display board, and other hand-held devices such as a personal digital assistant (PDA), a cell phone, a Blackberry-type device; and combinations thereof.

In one aspect of the invention, trainee 14 may conduct the training session without assistance from others, for example, without the assistance of trainer 16. In one aspect, the training session may be conducted by the trainer apparatus 12 alone, that is, by providing appropriate instructions to trainee 14, for example, via display 13 or through audible instructions. The logic and control system of training apparatus 12 may include some intelligence, for example, whereby trainee 14 may be guided through a training session without input by another human trainer 16.

Whether assisted by a human trainer 16 or by training apparatus 12 itself, in one aspect of the invention, at least three modes of operation may be provided in which a trainee 14 may be trained: (1) instruct mode; (2) test mode; and (3) compete mode. When in instruct mode, the trainer 16 or the training apparatus 12 instructs trainee 14 how to use a fire extinguisher. Commands, such as voice instructions given by trainer 14 or a speaker or voice synthesizer in apparatus 12 or visual commands provided on display 13 may instruct trainee 14. Alternatively, the logic and control system may instruct trainee 14 by printing instruction documents, displaying visual instructions on a separate monitor, television, or large screen display, and the like. For example, trainee 14 may hear the command "Pull" from trainer 16 or from the control system indicating to trainee 14 to pull the pin from the fire extinguisher. Next, trainer 16 or the control system may prompt trainee 14 with the command, "Aim," where trainee 14 then aims the nozzle/hose of fire extinguisher 18 at training apparatus 12, for example, at the base of apparatus 12, below the simulated flames. The next command may be "Squeeze," which would instruct trainee 14 to squeeze the extinguisher lever/actuator/release to initiate discharge of extinguishant or emission of stimulus. A further command may be "Sweep," where trainee 14 is instructed to sweep extinguisher 18 back and forth in an attempt to extinguish the simulated flame. In another aspect of the invention, it can be envisioned that the commands/instructions may include instructions on how to choose the proper fire extinguisher to extinguish a fire or instructions advising trainee 14 when it is too dangerous to extinguish a fire and to evacuate the training area. These and other instructions may be provided by a human trainer 16 or automatedly by the control system of training apparatus 12.

Another mode of operation of training apparatus 12 may be a "Test" mode. In Test mode, trainee 14 may be tested or evaluated on his or her ability to control or extinguish a fire simulated by apparatus 12, for example, when operated according to a predetermined protocol, for instance, corresponding to a class C fire. In test mode, trainer 16 may or may not be present. A third mode of operating training apparatus 12 may be "Compete" mode. In compete mode, multiple trainees 14 may compete on one or more training apparatus 12 and have their performance data computed, recorded, and saved by the logic and control system. The performance data of the two or more trainees 14 can then be compared, for example, during a session or afterward, to determine which trainee's performance was better, for example, which had the highest score. Other modes of operation of training apparatus 12 may also be envisioned.

In another aspect of the invention, a simulated "burn room" trainer may be provided, that is, one or more training apparatus 12 may be arranged in a room or room-like enclosure to simulate the training of, for example, a firefighter's handling of one or more fires in the room. This aspect of the invention is most easily illustrated with reference to system 310 shown in FIG. 12.

Figure 12:
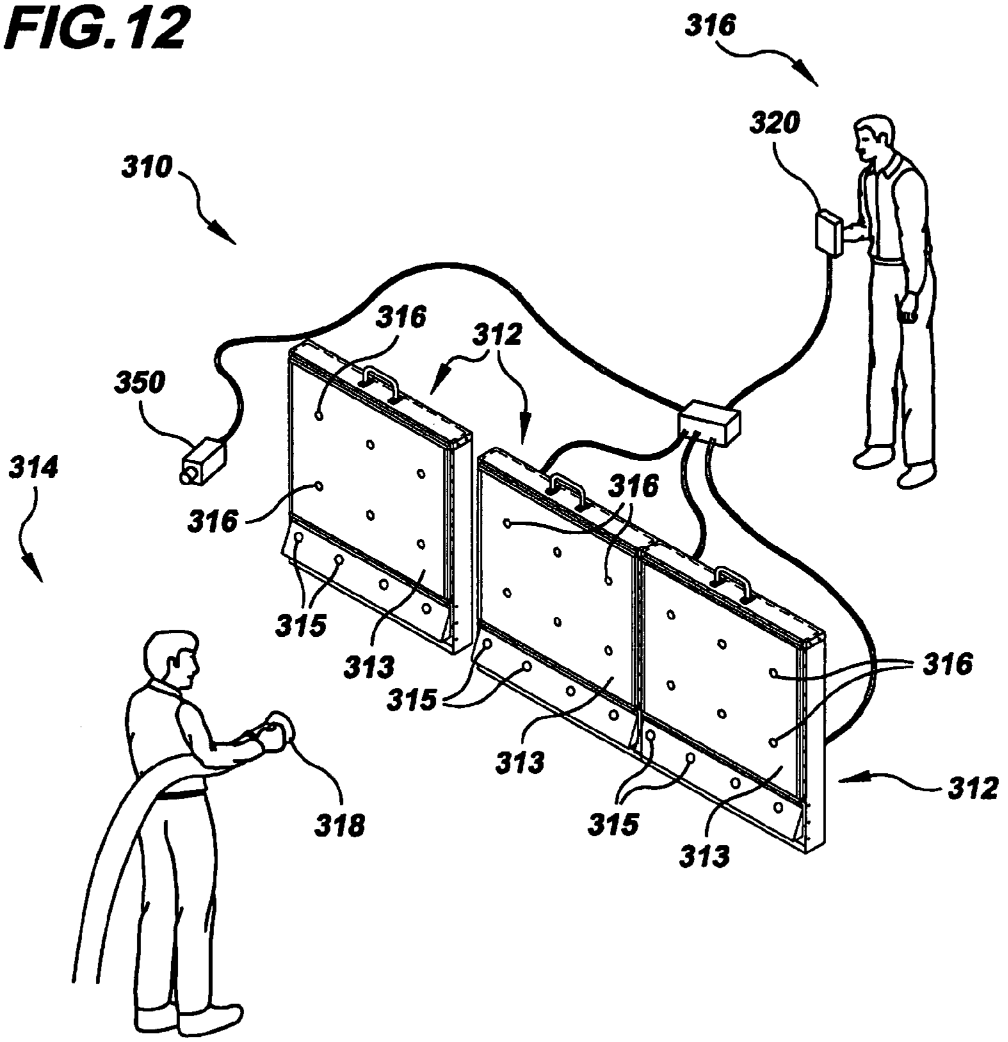
FIG. 12 is perspective view similar to FIG. 10 of a schematic illustration of another system according to aspects of the invention.

FIG. 12 illustrates a system 310 similar to system 110 shown in FIG. 11, but having modified training apparatus comprising one or more training apparatus 312, which may have all the functionality and attributes of training apparatus 12 discussed above, but further modifications as discussed below. As shown in FIG. 12, trainee 314 (holding extinguisher 318) and trainer 316 operate two or more training apparatus 312 which may be positioned in one or more rooms with appropriate communication between apparatus and one or more controllers 320, for example, wired or wirelessly. Training apparatus 312 include displays 313, which may be similar in design and function to displays 13, and may include sensors 315, which may be similar in design and function to sensors 15. In one aspect, the training apparatus 312 may be modified from apparatus 12 discussed above to provide means for detecting and displaying the direction of aim of extinguisher 318; the vicinity or point of impact of the stimulus emitted by extinguisher 318 upon apparatus 312, for example, upon displays 31; or the distance of extinguisher 318 from training apparatus 12, among other things. In one aspect, these modifications to apparatus 312 may include the addition of further sensing devices 316 (see FIG. 12), programming, and light sources capable of displaying the direction or point of contact. For example, one or more sensors 316 may be mounted in, behind, or in front of display 313, for example, in a uniformly spaced distribution. These sensors 316 associated with displays 313 may detect stimulus from an extinguisher 318 directed at displays 313, for example, instead of below display 13 toward sensor panel 34 of training apparatus 12. According to this aspect of the invention, sensors 316 are adapted to detect the presence of a stimulus, for example, one or more of the stimuli discussed above, transmit a signal corresponding to the detected stimulus to the logic and control system on PCB 44 of training apparatus 312, and through appropriate data analysis determine the point or vicinity of impact of the stimulus upon display 313. Moreover, in one aspect, displays 313 are modified to display the point or vicinity of impact of the stimulus.

Figure 13:
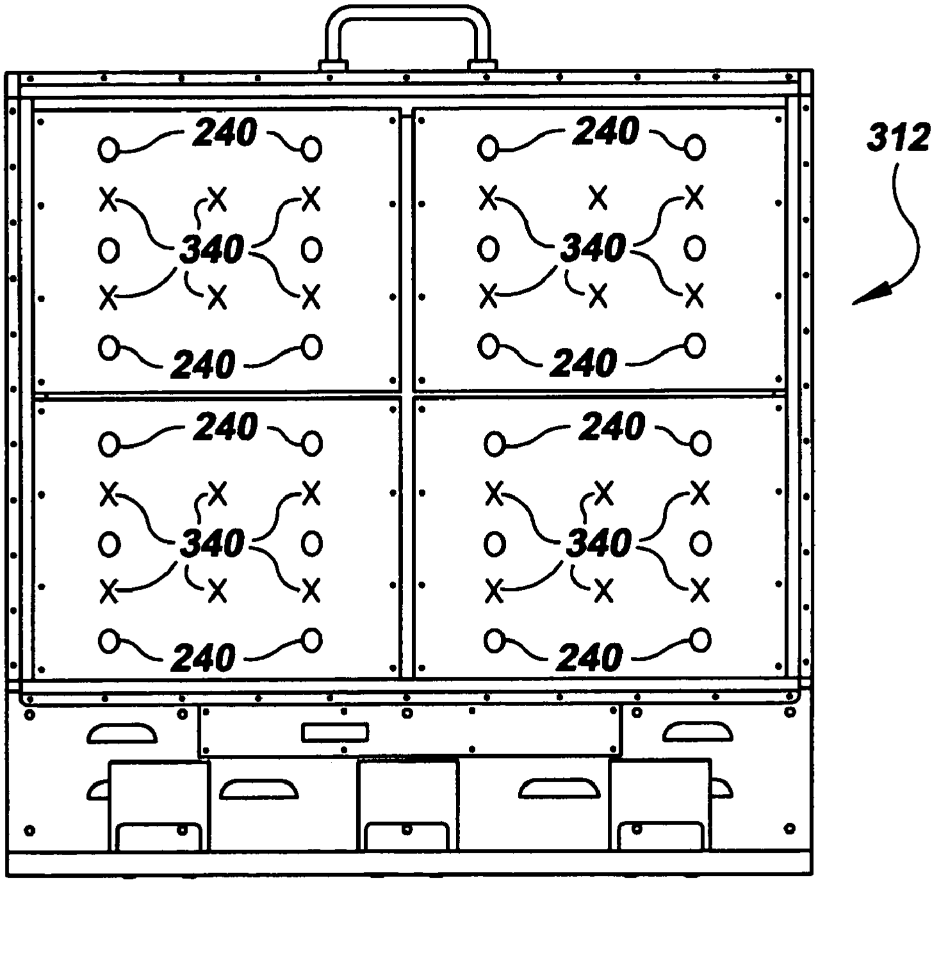
FIG. 13 is a front elevation view similar to FIG. 3 of a fire extinguisher training apparatus with front panels removed according to another aspect of the invention.

In one aspect, the display 313 includes a second array of light sources, for example, in addition to the array of light sources 40 shown in FIG. 3. This arrangement of a second set of light sources is shown in FIG. 13. FIG. 13 is a view similar to FIG. 3 but having a second set of light sources 340, different from first light sources 240, which may be similar to light sources 40 described above with respect to FIG. 3. For example, first light sources 240 may comprise one color and the second light sources 340 may comprise another color, different from the color of light sources 240. As before, the light sources 240 and 340 may be incandescent, fluorescent, EL lights, lasers, plasma lights, and the like, but in one aspect, the light sources may be LEDs. According to this aspect of the invention, light sources 340 are controlled by the logic and control system on PCB 44 in response to the stimulus (for example, one or more of the stimuli discussed above with respect to sensors 15, such as, visible light or radio waves) detected by sensors 316 shown in FIG. 12 to display the point or vicinity of the impact of the stimulus upon display 313. That is, according to one aspect of the invention, two different color light patterns may be displayed on displays 313: (1) a light pattern with a first color, for example, orange, simulating a flame pattern in response to the stimulus received from sensors 315 (and the control algorithm selected) and (2) a light pattern with a second color, for example, blue, identifying the point or vicinity of impact of the stimulus from extinguisher 318 upon displays 313.

Aspects of the invention shown in FIGS. 12 and 13 may be used in conjunction with an auxiliary device 350, for example, a smoke-generating device. A smoke-generating device may be operated to increase smoke output as the simulated flames grow, and decrease the smoke output as the simulated flames are extinguished. The simulated flame on displays 313 and smoke could also alter in accordance with a preprogrammed scenario. When smoke generation is used, a smoke sensor for determining the density of the smoke may also be included in systems 10, 110, and 310. Additionally, a vent sensor to detect the opening of a door or window may also be introduced to systems 10, 110, or 310.

According to the aspects of the invention shown in FIG. 10 and 12, apparatus 12 and 312 having displays, 13 and 313, respectively, may be distributed throughout an area, such as throughout a room, room-like enclosure, building, or building-like enclosure. Apparatus 12 and 312 may be arranged separately or attached together. Apparatus 12 and 312 may be mounted on the walls or ceilings of the enclosure, may be freestanding, or may be mounted to an object in the enclosure, such as, mounted to a piece of furniture. When systems 10, 110, and 310 are being used with a smoke generating device, the smoke output typically is directed into the enclosure. The smoke generating device itself may be positioned inside or outside of the room or enclosure. In one aspect, systems 10, 110, and 310 may be adapted for use in separate rooms, or in an area that is separated into different compartments to simulate different proximate or distal rooms.

According to aspects of the invention, systems 10, 110, and 310 may be activated as described above, for example, with controller 20, 120, or 320 from inside or outside the enclosure, for example, by depressing ignition button 54 on controller 20. Once system 10, 120, or 320 is activated, a predetermined fire simulation may be provided. As is typical of the systems described above, the training simulation includes flame simulation and, if the smoke machine is being used, smoke output. The flame simulation may start by activating the simulated flames on one or more displays 13, 313 and then building over time by activating further displays 13, 313, or all displays may be activated when the training session is begun. When smoke generating devices are used, the smoke generating devices may also be activated at the beginning of the training session. The smoke generation may be controlled, for example, producing a relatively low smoke output initially and then increasing the smoke output with time, for example, as the simulated flames increase or spread. The smoke generation may also be provided at a relatively high level from the start. Other scenarios for displaying flames and generating smoke will be apparent to those skilled in this art.

One or more trainees 314 or trainers 316 may enter the room and use extinguisher 318, and controller 320 as described in the previous aspects. According to the aspect shown in FIG. 12, when extinguisher 318 emits a stimulus aimed at the flame simulation displays 313, one set of light sources 240, for example, LEDs, will vary the flame pattern in response to the technique used by trainee 214 and the second set of light sources 340, again, for example, LEDs, will illuminate to simulate where extinguisher 318 is pointing. When the extinguisher 318 is operated so that the control system determines the technique employed by trainee 314 satisfactorily directs extinguisher 318 toward sensors 315, the simulated flames in the vicinity of the sensors 315 decrease in size, until they are extinguished. When a smoke generator is used, a decrease in the output of smoke may accompany the proper extinguishment of a simulated fire. Typically, trainee 314 must extinguish all the simulated flames in the enclosure for the training session to be completed. In one aspect, if trainee 314 does not extinguish all of the simulated flames, the flames may “spread” from one display 312 to another display 312, for example, a formerly inactive display 312. In addition, the smoke output may increase if a smoke-generating device is being used.

Aspects of the present invention provide advantageous methods and apparatus for training, for example, firefighters and other public safety personnel in the proper handling and use of a fire extinguisher. However, unlike prior art training devices, aspects of the present invention are devoid of any open flame. That is, aspects of the invention may provide fire extinguisher training in environments where open flames are undesirable or hazardous. Aspects of the invention may be used for informal training or for formal training, for example, for certification of firefighters and others.

Various modifications and variations of the described apparatus and methods of the invention will be apparent to those skilled in the art without departing from the scope and spirit of the invention. Although the invention has been described in connection with specific embodiments, outlined above, it should be understood that the invention should not be unduly limited to such specific embodiments. Various changes may be made without departing from the spirit and scope of the invention as defined in the following claims. Accordingly, it is intended by the appended claims to cover all such alternative aspects as fall within the true spirit and scope of the invention.

The invention claimed is:

1. A portable fire extinguisher training apparatus comprising:

a display mounted in a portable housing and comprising a plurality of light sources adapted to display a varying light pattern simulating a dynamic flame;

a plurality of sensors mounted on the portable housing and adapted to detect a stimulus emitted by one of a fire extinguisher and a fire extinguisher simulator and output a signal corresponding to the detected stimulus; and one or more processors adapted to receive the output from at least one of the plurality of sensors and vary illumination of at least some of the plurality of light sources in a vicinity of a sensor on the housing that detects the stimulus to simulate variation of the dynamic flame on the display in the vicinity of the sensor.

2. The fire extinguisher training apparatus as recited in claim 1, wherein the display further comprises at least one first panel mounted in front of the varying light pattern adapted to vary a path of light emitted by the varying light pattern.

3. The fire extinguisher training apparatus as recited in claim 2, wherein the display further comprises at least one second panel mounted in front of the first panel adapted to further vary the path of the light emitted by the varying light pattern.

4. The fire extinguisher training apparatus as recited in claim 1, wherein the display further comprises at least one sensor adapted to detect a vicinity of impact on the display of the stimulus emitted by one of the fire extinguisher and the fire extinguisher simulator.

5. The fire extinguisher training apparatus as recited in claim 4, wherein the vicinity of impact comprises a point of impact on the display.

6. The fire extinguisher training apparatus as recited in claim 1, wherein the stimulus emitted by one of a fire extinguisher and a fire extinguisher simulator comprises one of an electromagnetic signal, a pressure wave signal, a solid particle stream, and a fluid stream.

7. The fire extinguisher training apparatus as recited in claim 6, wherein the stimulus comprises a pressure wave signal and wherein the pressure wave signal comprises a sonic wave.

8. The fire extinguisher training apparatus as recited in claim 1, further comprising a controller adapted to regulate operation of the apparatus.

9. The fire extinguisher training apparatus as recited in claim 8, wherein the controller regulates the varying light pattern on the display.

10. The fire extinguisher training apparatus as recited in claim 8, wherein the controller regulates the operation of the apparatus in compliance with a predetermined algorithm.

11. The fire extinguisher training apparatus as recited in claim 10, wherein the predetermined algorithm corresponds to at least one of the following U.S. fire classes: A, B, C, and D.

12. The fire extinguisher training apparatus recited in claim 1, further comprising a fire extinguisher simulator adapted to emit a stimulus detectable by the fire extinguisher training apparatus, the fire extinguisher simulator comprising:

a housing adapted to be held by a trainee;

a source of stimulus mounted in the housing; and means for actuating the source of stimulus.

13. The fire extinguisher simulator as recited in claim 12, wherein the source of stimulus comprises a transmitter adapted to emit one of electromagnetic radiation, pressure waves, a fluid, and a solid particle stream.

14. The fire extinguisher simulator as recited in claim 12, wherein the means for actuating comprises a manual actuator engagable by the trainee.

15. The fire extinguisher simulator as recited in claim 14, wherein the source of stimulus comprises at least one electromagnetic radiation emitter adapted to be actuated by the manual actuator.

16. The fire extinguisher simulator as recited in claim 12, wherein the housing simulates a fire hose nozzle.

17. The fire extinguisher training apparatus as recited in claim 1, wherein the apparatus further comprises one or more smoke generating devices.

18. The fire extinguisher training apparatus as recited in claim 1, wherein the one or more processors are further adapted to receive the output from the at least one sensor and display at least a vicinity of impact of the stimulus on the display.

19. The fire extinguisher training apparatus as recited in claim 1, wherein the plurality of light sources comprise a plurality of LEDs.

20. The fire extinguisher training apparatus as recited in claim 1, wherein the plurality of sensors are adapted to detect electromagnetic radiation.

21. The fire extinguisher training apparatus as recited in claim 20, wherein the electromagnetic radiation comprises visible light.

22. The fire extinguisher training apparatus as recited in claim 1, wherein the plurality of sensors are adapted to detect a fluid.

23. The fire extinguisher training apparatus as recited in claim 22, wherein the fluid comprises water.

24. A fire extinguisher training method comprising:

displaying a varying light pattern on a display mounted in a portable housing, the varying light pattern comprising a plurality of light sources simulating a dynamic flame;

detecting a stimulus emitted by one of a fire extinguisher and a fire extinguisher simulator by at least one sensor of a plurality of sensors mounted on the housing and generating an output signal corresponding to the detected stimulus; and processing the output from the at least one sensor and varying illumination of at least some of the plurality of light sources of the light pattern on the display in a vicinity of a sensor that detects the stimulus to simulate variation of the dynamic flame on the display in the vicinity of the sensor that detects the stimulus.

25. The fire extinguisher training method recited in claim 24, wherein the method further comprises varying a path of the light pattern to enhance visual appearance of the simulated flame.

26. The fire extinguisher training method recited in claim 24, wherein the method further comprises detecting orientation of the fire extinguisher or the fire extinguisher simulator and displaying a vicinity of impact of the stimulus on the display.

27. The fire extinguisher training method recited in claim 24, wherein the method further comprises varying operation of apparatus implementing the method to conform to a predetermined fire extinguisher operating protocol.

28. The fire extinguisher training method recited in claim 27, wherein the method further comprises varying operation of apparatus implementing the method to conform to at least one predetermined fire extinguisher operating protocol.

29. The fire extinguisher training method recited in claim 28, wherein the at least one predetermined operating protocol comprises a plurality of algorithms corresponding to a class of fire.

30. The fire extinguisher training method as recited in claim 29, wherein the class of fire comprises one of a U.S. fire class and a European fire class.

31. The fire extinguisher training method as recited in claim 30, wherein the class of fire comprises one or more of U.S. class A, class B, class C, class D, and class K.

32. The fire extinguisher training method as recited in claim 30, wherein the class of fire comprises one or more of European class A, class B, class C, class D, class E, and class F.

33. The fire extinguisher training method recited in claim 24, wherein the displaying a varying light pattern comprises displaying the pattern on a display, and wherein the method further comprises detecting a vicinity of impact of the stimulus emitted by one of a fire extinguisher and fire extinguisher simulator on the display; and displaying the vicinity of impact contact on the display.

34. The fire extinguisher training method recited in claim 24, wherein the method comprises a plurality of modes of operation.

35. The fire extinguisher training method recited in claim 34, wherein the plurality of modes of operation comprise one or more of instruct mode, test mode, and compete mode.

36. A portable fire extinguisher training apparatus comprising:

a display mounted in a portable housing and having a plurality of light emitting diodes adapted to simulate a dynamic flame;

a plurality of sensors mounted on the portable housing and adapted to detect a stimulus emitted by one of a fire extinguisher and a fire extinguisher simulator and output a signal corresponding to the detected stimulus; and one or more processors adapted to receive the output from at least one of the plurality of sensors and vary illumination of at least some of the light emitting diodes on the display in a vicinity of a sensor on the housing that detects the stimulus to simulate variation of the dynamic flame on the display in the vicinity of the sensor.

37. The fire extinguisher training apparatus as recited in claim 36, wherein the display further comprises a first and a second panel mounted in front of the plurality of light emitting diodes to vary a path of light emitted by the plurality of light emitting diodes to enhance appearance of the simulated dynamic flame.

38. The fire extinguisher training apparatus as recited in claim 36, wherein the plurality of sensors comprise a first plurality of sensors, and wherein the apparatus further comprises a second plurality of sensors adapted to detect a vicinity of impact of the stimulus, and wherein the training apparatus further comprises means for displaying the vicinity of impact on the display.

39. The fire extinguisher training apparatus as recited in claim 36, further comprising a controller adapted to regulate operation of the apparatus.

40. The fire extinguisher training apparatus as recited in claim 36, wherein the one or more processors include a microcontroller and a plurality of preprogrammed algorithms adapted to control operation of the display.

41. The fire extinguisher training apparatus as recited in claim 40, wherein the plurality of preprogrammed algorithms corresponds to at least one of the following U.S. fire classes: A, B, C, D, and K.

42. The fire extinguisher training apparatus as recited in claim 36, wherein the plurality of sensors comprise one or more infrasonic, audible, and ultrasonic sensors.

43. The fire extinguisher training apparatus as recited in claim 42, wherein the plurality of sensors comprise one or more ultrasonic sensors.

44. The fire extinguisher training apparatus as recited in claim 36, wherein the apparatus further comprises one or more smoke generating devices.

45. The fire extinguisher training apparatus as recited in claim 36, wherein one or more processors are further adapted to receive the output from the plurality of sensors and display at least a vicinity of impact of the stimulus on the display.

46. A portable fire extinguisher training apparatus comprising:

a display mounted in a portable housing and having a plurality of light sources adapted to simulate a dynamic flame;

a plurality of sensors mounted on the portable housing and adapted to detect a stimulus emitted by one of a fire suppressing device and a fire suppressing device simulator and output a signal corresponding to the detected stimulus;

one or more processors adapted to receive the output from at least one sensor of the plurality of sensors and generate a flame control signal adapted to vary illumination of at least some of the plurality of light sources on the display in a vicinity of a sensor that detects the stimulus to simulate variation of the dynamic flame on the display in the vicinity of the sensor; and a controller adapted to vary the generated flame control signal in accordance with at least one predetermined algorithm.

47. The fire extinguisher training apparatus recited in claim 46, wherein the at least one predetermined algorithm comprises a plurality of algorithms corresponding to a class of fire.

48. The fire extinguisher training apparatus as recited in claim 47, wherein the class of fire comprises one of a U.S. fire class and a European fire class.

49. The fire extinguisher training apparatus as recited in claim 47, wherein the class of fire comprises one or more of U.S. class A, class B, class C, class D, and class K.

50. The fire extinguisher training apparatus as recited in claim 47, wherein the class of fire comprises one or more of European class A, class B, class C, class D, class E, and class F.

51. A fire extinguisher training method comprising:

providing a display having a plurality of light sources adapted to simulate a dynamic flame;

providing a plurality of sensors mounted on the housing and adapted to detect a stimulus emitted by one of a fire suppressing device and a fire suppressing device simulator and output a signal corresponding to the detected stimulus;

emitting a stimulus from one of the fire suppressing device and the fire suppressing device simulator;

detecting the stimulus from the at least one of the plurality of sensors and generating a sensor output;

generating a flame control signal from the sensor output, the flame control signal adapted to vary at least some of the plurality of light sources on the display in a vicinity of a sensor that detects the stimulus to simulate variation of the dynamic flame on the display in the vicinity of the sensor that detects the stimulus; and varying the flame control signal in accordance with at least one predetermined algorithm.

52. The fire extinguisher training method recited in claim 51, wherein the at least one predetermined algorithm comprises a plurality of algorithms corresponding to a class of fire.

53. The fire extinguisher training method as recited in claim 52, wherein the class of fire comprises one of a U.S. fire class and a European fire class.

54. The fire extinguisher training method as recited in claim 52, wherein the class of fire comprises one or more of U.S. class A, class B, class C, class D, and class K.

55. The fire extinguisher training method as recited in claim 52, wherein the class of fire comprises one or more of European class A, class B, class C, class D, class E, and class F.

56. The fire extinguisher training method recited in claim 51, further comprising:

detecting a vicinity of impact of the stimulus emitted by one of the fire suppressing device and the fire suppressing device simulator on the display; and displaying the vicinity of impact on the display.

57. The fire extinguisher training method recited in claim 51, wherein the method comprises a plurality of modes of operation.

58. The fire extinguisher training method recited in claim 1, wherein the plurality of modes of operation comprise one or more of instruct mode, test mode, and compete mode.

* * * * *

UNITED STATES PATENT AND TRADEMARK OFFICE

CERTIFICATE OF CORRECTION

PATENT NO. : 7,748,983 B2
APPLICATION NO. : 11/369303
DATED : July 6, 2010
INVENTOR(S) : Blackburn et al.

It is certified that error appears in the above-identified patent and that said Letters Patent is hereby corrected as shown below:

Claim 58, at Column 22, Line 44: Delete "claim 1," and insert -- claim 57, --

Signed and Sealed this

Fifth Day of October, 2010

David J. Kappos

David J. Kappos
*Director of the United States Patent and Trademark Office*